(12) United States Patent
Miyashiro et al.

(10) Patent No.: US 10,866,400 B2
(45) Date of Patent: Dec. 15, 2020

(54) DATA RECOVERY DEVICE, MICROSCOPE SYSTEM, AND DATA RECOVERY METHOD

(71) Applicant: RIKEN, Wako (JP)

(72) Inventors: Daisuke Miyashiro, Wako (JP); Akihiko Nakano, Wako (JP)

(73) Assignee: RIKEN, Wako (JP)

( * ) Notice: Subject to any disclaimer, the term of this patent is extended or adjusted under 35 U.S.C. 154(b) by 67 days.

(21) Appl. No.: 16/309,781

(22) PCT Filed: Jun. 9, 2017

(86) PCT No.: PCT/JP2017/021420
§ 371 (c)(1),
(2) Date: Dec. 13, 2018

(87) PCT Pub. No.: WO2017/217325
PCT Pub. Date: Dec. 21, 2017

(65) Prior Publication Data
US 2019/0113733 A1 Apr. 18, 2019

(30) Foreign Application Priority Data

Jun. 14, 2016 (JP) .................................. 2016-118225

(51) Int. Cl.
*G06K 9/00* (2006.01)
*G02B 21/36* (2006.01)
(Continued)

(52) U.S. Cl.
CPC ....... *G02B 21/365* (2013.01); *G01N 21/6458* (2013.01); *G02B 21/00* (2013.01);
(Continued)

(58) Field of Classification Search
None
See application file for complete search history.

(56) References Cited

U.S. PATENT DOCUMENTS

| 4,922,092 A | * | 5/1990 | Rushbrooke | ........... G01N 21/76 |
| | | | | 250/214 VT |
| 2006/0126921 A1 | * | 6/2006 | Shorte | .................... G02B 21/22 |
| | | | | 382/154 |

(Continued)

FOREIGN PATENT DOCUMENTS

| EP | 2403234 A1 * | 1/2012 | ......... H04N 5/23212 |
| EP | 2503364 A1 * | 9/2012 | ............. G02F 1/137 |

(Continued)

OTHER PUBLICATIONS

Effects of aberrations and specimen structure in conventional, confocal and two-photon fluorescence microscopy, R.D Simmonds et al., Journal of Microscopy, Aug. 3, 2011, pp. 63-71 (Year: 2011).*

(Continued)

*Primary Examiner* — Jayesh A Patel
(74) *Attorney, Agent, or Firm* — Birch, Stewart, Kolasch & Birch, LLP

(57) ABSTRACT

Provided is a data recovery device, having: an acquiring unit that acquires photon detection number distribution of an image acquired from an imaging optical system; a recovering unit that acquires an estimated image from the photon detection distribution using a predetermined IPSF (an inverse function of a point spread function PSF); an evaluation value calculating unit that calculates, in relation to each of the estimated image and a plurality of images similar to the estimated image, an evaluation value indicating a likelihood that the image is an actual image; and an outputting unit that generates and outputs a physical parameter with which the evaluation value is at least a significance level.

16 Claims, 8 Drawing Sheets

(51) Int. Cl.
  *H04N 5/232* (2006.01)
  *G06T 3/40* (2006.01)
  *G06T 1/00* (2006.01)
  *G02B 21/00* (2006.01)
  *G06T 5/20* (2006.01)
  *G06T 5/00* (2006.01)
  *G06T 7/00* (2017.01)
  *G06T 7/73* (2017.01)
  *G01N 21/64* (2006.01)
  *G02B 21/16* (2006.01)

(52) U.S. Cl.
  CPC ............ *G02B 21/16* (2013.01); *G06T 1/00* (2013.01); *G06T 3/40* (2013.01); *G06T 5/003* (2013.01); *G06T 5/20* (2013.01); *G06T 7/0002* (2013.01); *G06T 7/74* (2017.01); *H04N 5/232* (2013.01); *G01N 21/64* (2013.01); *G06T 2207/10056* (2013.01); *G06T 2207/10064* (2013.01); *G06T 2207/30168* (2013.01)

(56) References Cited

U.S. PATENT DOCUMENTS

| | | | | |
|---|---|---|---|---|
| 2007/0201732 A1* | 8/2007 | Wahlsten | ............... | G06T 5/10 382/120 |
| 2009/0148065 A1* | 6/2009 | Halsted | ............... | G06T 3/4061 382/284 |
| 2012/0081535 A1 | 4/2012 | Hayashi | | |
| 2014/0036057 A1 | 2/2014 | Hayashi | | |

FOREIGN PATENT DOCUMENTS

| | | | |
|---|---|---|---|
| JP | 2003-255231 | A | 9/2003 |
| JP | 2004-93721 | A | 3/2004 |
| JP | 3837495 | B2 | 10/2006 |
| JP | 2009-188891 | A | 8/2009 |
| JP | 2012-78408 | A | 4/2012 |
| JP | 5412394 | B2 | 2/2014 |

OTHER PUBLICATIONS

Agard et al., "Three-dimensional architecture of a polytene nucleus", Macmillan Journals Ltd., Apr. 21, 1983, vol. 302, No. 5910, pp. 676-681.
Gustafsson, "Surpassing the lateral resolution limit by a factor of two using structured illumination microscopy", Journal of Microscopy, May 2000, vol. 198, Pt 2, pp. 82-87.
Harris, "Diffraction and Resolving Power", Journal of the Optical Society of America, Jul. 1964, vol. 54, No. 7, pp. 931-936.
Heintzmann et al., "Lateraly Modulated Excitation Microscopy: Improvement of resolution by using a diffraction grating", Applied Optics and Information Processing Division Institute of Applied Physics, 1999 Proc. SPIE 3568 185-96, Total 13 pages.
International Search Report (PCT/ISA/210) issued in PCT/JP2017/021420, dated Sep. 12, 2017.
Rust et al., "Stochastic optical reconstruction microscopy (STORM) provides sub-diffraction-limit image resolution", Nat Methods, Oct. 2006; 3(10): 793-795. doi:10.1038/nmeth929, Total 7 pages.
Written Opinion (PCT/ISA/237) issued in PCT/JP2017/021420, dated Sep. 12, 2017.

* cited by examiner

LIKELIHOOD IN CASE
OF TWO PIXELS

LIKELIHOOD IN CASE
OF THREE PIXELS

DATA RECOVERY DEVICE, MICROSCOPE SYSTEM, AND DATA RECOVERY METHOD

TECHNICAL FIELD

The present invention relates to a data recovery technique using deconvolution.

BACKGROUND ART

In images measured by a microscope (including a still image and a moving image), a diffraction causes blur in a spatial structure of an observation object. A measured image (IM) and an actual object (OBJ) are expressed using a point spread function (PSF) of the imaging optical system, as in:

Measured image (IM)=point spread function (PSF)*object (OBJ).

Here "*" represents a convolution.

Therefore by convoluting the measured image (IM) with an inverse function of the point spread function (IPSF), the original super resolution image can be acquired (IPSF*IM=IPSF*PSF*OBJ=OBJ). This is the principle of the deconvolution method.

In the case of the deconvolution method for a microscope image as described in NPL 1, a large SN ratio is demanded to recover the information outside the passing band of the objective lens of the microscope. Therefore in a convolutional deconvolution software, a recovered image is acquired by eliminating the out-of-band information by a filter, or by using an asymptotic method, so as to suppress noise.

Besides the deconvolution method, the SIM (structured illumination microscopy), the Localization method, the Airy scan method (see NPL 2 to 4 and PTL 1 and 2) and the like are available for acquiring a super resolution image.

CITATION LIST

Patent Literature

[PTL 1] Japanese Patent No. 3837495
[PTL 2] Japanese Patent No. 5412394
[PTL 3] Japanese Patent Application Publication No. 2004-93721

Non Patent Literature

[NPL 1] Agard D A and Sedat J W 1983 Nature 302 676-81
[NPL 2] Heintzmann R and Cremer C 1999 Proc. SPIE 3568 185-96
[NPL 3] Gustafsson M G L 2000 J. Microsc. 198 82-7
[NPL 4] Rust M J et al 2006 Nat. Methods 3 793-5
[NPL 5] Harris, James L. "Diffraction and Resolving Power." JOSA 54.7 (1964): 931-936

SUMMARY OF INVENTION

Technical Problem

In the case of the deconvolution method of NPL 1, however, the information outside the band is eliminated by the filter, hence the recoverable microstructure is limited. Further, the estimation method is not perfectly reliable since it uses point estimation.

In the case of the methods according to NPL 2 to 4 and PTL 1 and 2, the spatial resolution is improved, but it is difficult to improve the time resolution at the same time.

With the foregoing in view, it is an object of the present invention to implement super resolution which can quantitatively evaluate reliability by indexes and which can further improve the spatial resolution.

Solution to Problem

An aspect of the present invention is a recovery device, having: acquiring means adapted to acquire photon detection number distribution of an image acquired from an imaging optical system; recovering means adapted to acquire an estimated image from the photon detection distribution using a predetermined IPSF (an inverse function of a point spread function PSF); evaluation value calculating means adapted to calculate, in relation to each of the estimated image and a plurality of images similar to the estimated image, an evaluation value indicating a likelihood that an image is an actual image; and outputting means adapted to generate and output a physical parameter with which the evaluation value is at least a significance level.

Here it is preferable that the PSF is generated from an image capturing a point light source, and the IPSF is generated, using out-of-band extrapolation, from the PSF and the image capturing the point light source. The captured image does not include frequency components outside the passing band of the optical system, but the frequency components outside the passing band can be acquired from the information within the passing band using extrapolation.

It is preferable that the photon detection number distribution is acquired by the photon counting. In other words, it is preferable that the acquiring means is adapted to acquire the photon detection number distribution by determining the detection number of photons in each of a plurality of images which are captured such that the photons can be counted. And it is preferable that the acquiring means is adapted to acquire the photon detection number distribution under the assumption that one photon is detected at the center of luminance distribution in each of a plurality of images captured under a single photon condition. To acquire such photon detection number distribution, it is preferable that the acquiring means is adapted to acquire an image captured by a microscope which includes an image intensifier and an imaging apparatus, and to acquire the photon detection number distribution based on the image.

The luminance acquired by the imaging apparatus also represents the distribution of the photon detection number, hence the luminance values of the captured image may be used as the photon detection number distribution.

The evaluation value according to the present invention may be a value indicating a probability of acquiring the photon detection number distribution under the assumption that the estimated image is the actual image. The error evaluation may be performed by the most likelihood estimation method, the Bayesian estimation method, the least square method or the like, and a value in accordance with the error evaluation method may be used for the evaluation value.

Examples of the physical parameter according to the present invention are: an image representing the observation object, a profile, a position, and an edge. In the case of outputting an image of the observation object as the physical parameter, it is preferable that the outputting means is adapted to perform a binning process based on the estimated image and a plurality of images similar to the estimated image, and to generate and output an image of which the evaluation value is at least a significance level. Here the term "output" refers to not only displaying the data on a display device, but also includes storing the data in a storage device, and transmitting the data using a communication device.

The present invention may be regarded as a microscope system, having: a microscope which includes an image intensifier and an imaging apparatus; and the above-mentioned data recovery device. Here it is preferable that the microscope can capture an image at high-speed and high resolution, so that proton counting is possible.

The present invention may also be regarded as a data recovery device (image recovery device) or a microscope system which includes at least a part of the above-mentioned units. The present invention may also be regarded as a data recovery method (image recovery method) or a measurement method in the microscope system, which includes at least a part of the above-mentioned process. Further, the present invention may be regarded as a computer program that causes a computer to execute this method, or as a non-transitory computer-readable storage medium which stores this computer program. The respective above-mentioned units or the respective above-mentioned processes may be combined as much as possible to implement the present invention.

Advantageous Effects of Invention

According to the present invention, super resolution can be implemented by quantitatively evaluating the reliability using indexes, and further improving the spatial resolution more than prior art.

DESCRIPTION OF EMBODIMENT

A method of implementing a super resolution microscope image according to the present invention will be described with reference to the drawings.

<Overview>

Deconvolution is a process to recover high frequency components that are deteriorated by diffraction blur, hence if deconvolution is performed on an image containing high frequency noise, this noise is enhanced. Therefore in the prior arts, out-of-band information is eliminated by a filter, or by using an asymptotic method, so as to suppress noise. With these methods, information is lost, which makes it impossible to implement a sufficiently high resolution. Therefore in the present invention, super high resolution is implemented without losing the out-of-band information.

In this method, a measured image is acquired using a high precision measurement system. The high precision measurement system here means a system which allows photon counting. It is especially preferable that the measurement is performed under a single photon condition, that is, a condition where each photon can be observed without an overlap of photon images.

Figure 1:
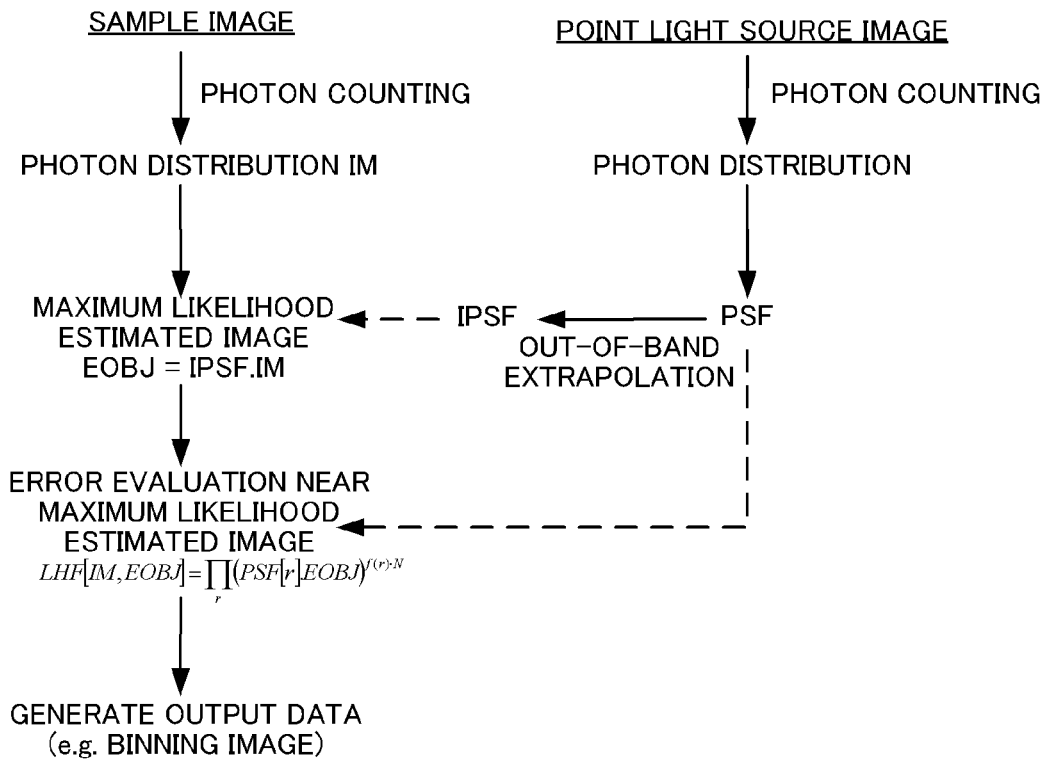
FIG. 1 is a diagram depicting an overview of an image recovery process according to the present method.

FIG. 1 is a diagram depicting a general flow of an image recovery method according to the present invention. First using the above-mentioned high precision measurement system, an observation target sample (e.g. biological sample) and an optical characteristic evaluation sample (micro-point light source, such as a Q-Dot (quantum dot)) are imaged respectively. Here these images are called a "sample image" and a "point light source image" respectively.

Figure 2:
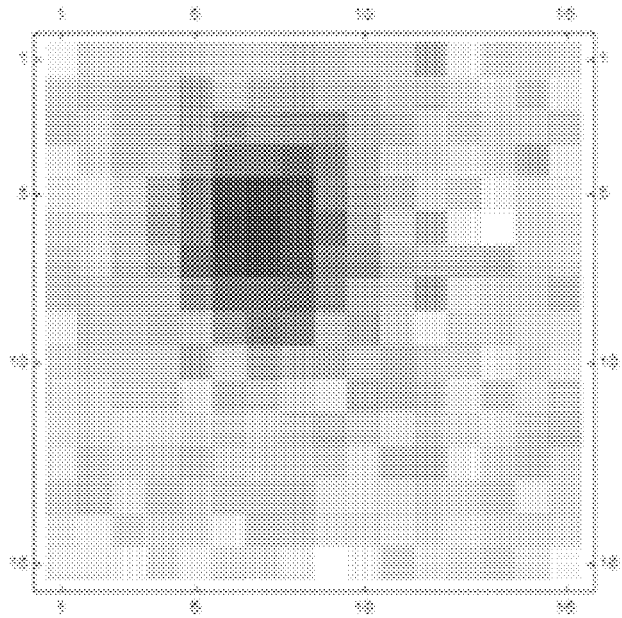
FIG. 2 is a diagram depicting the photon detection.

FIG. 2 indicates an enlarged view of a portion (one photon) of a captured image. The captured image is a result when one photon is amplified by an image intensifier, that is, one photon is detected at the center position of this image. By performing this process for time-series images at high-speed, a photon detection frequency in a four-dimensional space (three-dimensional space+time) can be acquired. In the following, the photon detection number distribution acquired from the captured image is also simply called a "captured image".

In this step, the fluctuation of amplification by the image intensifier and the noise of the camera are eliminated, hence the SN ratio improves compared with the images captured by a regular camera. Further, the absolute value of the detected photon number can be acquired.

First, PSF (Point Spread Function) is determined using the photon distribution of the point light source image. Then, IPSF (Inverse PSF) is determined using the PSF and the photon distribution of the point light source image. Here components outside the passing band of the imaging system are not included in the point light source image, but information outside the passing band can be acquired by extrapolation based on the information within the passing band, under the condition that the size of the visual field is finite (NPL 5). In the present method, the IPSF is determined by performing such out-of-band extrapolation.

Figure 3A:
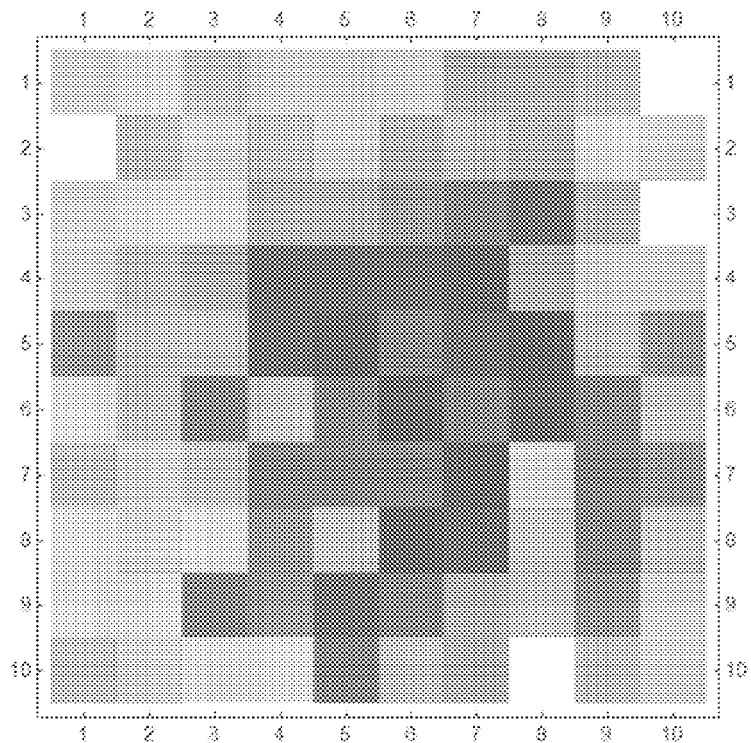
FIG. 3(A) is a diagram depicting the detected photon distribution IM of a captured image.
Figure 3B:
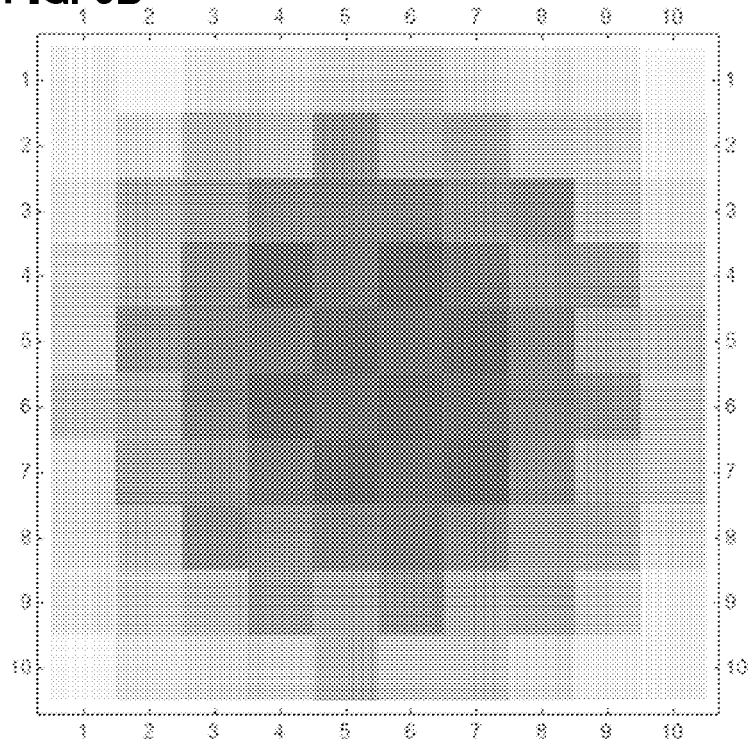
FIG. 3(B) is a diagram depicting a recovery result IPSF.IM thereof; and these diagrams are enlarged to indicate a single yeast SEC24 on a COP2 vesicle marked by green fluorescent protein GFP (1 pixel=39 nm).

By convolving the photon distribution of the sample image with IPSF, an actual image of the sample can be recovered. FIG. 3(A) is an example of a sample image IM (photon detection distribution), and FIG. 3(B) is the recovered result (IPSF*IM) thereof. The recovered result is full of amplified high frequency noise. Both FIG. 3(A) and FIG. 3(B) are enlarged views of one yeast SEC24 on a COP2 vesicle marked by the green fluorescent protein GFP.

Figure 4:
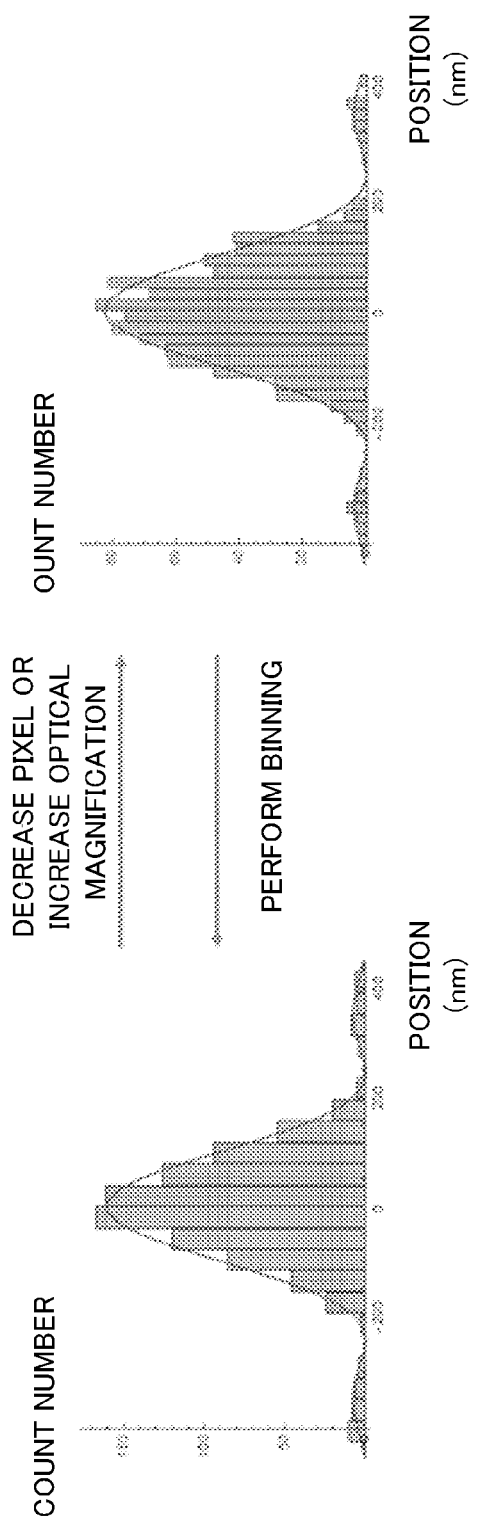
FIG. 4 is a diagram depicting the relationship between the binning process and the dispersion of proton numbers.

As illustrated in FIG. 4, when the detected photon number is finite, a probabilistic dispersion is generated in the detected photon number, which is the major component of the high frequency noise. Even if the photon number is the same, dispersion (fluctuation) changes depending on the pixel size. This fluctuation is amplified by the deconvolution, and ends in the result described in FIG. 3(B).

According to the present method, the photon number is determined, and a precise error evaluation is performed based on the photon number. The actual evaluation function for the error evaluation may be determined in accordance with the intended use, but here a case of using likelihood as the evaluation function will be described. In this case, the evaluation function (likelihood function) LHF can be defined as follows.

$$LHF[IM, EOBJ] = \prod_r (PSF[r] \cdot EOBJ)^{f(r) \cdot N} \quad \text{[Math. 1]}$$

Here f(r) denotes a value determined by dividing the photon number detected at the position r in the image IM by a total photon number N (that is, IM={f(r)}) and EOBJ denotes an estimated image. PSF[r].EOBJ denotes a probability that a photon is detected at the position r when the estimated image EOBJ is assumed to be the actual image. The likelihood function LHF denotes a probability that a measured image is acquired when the estimated image EOBJ is assumed to be the actual image.

The estimated image EOBJ, of which the evaluation value (likelihood) is at the maximum (maximum likelihood estimated value) is IPSF*{f(r)} (FIG. 3(B)). The total of PSF [r].EOBJ is 1, hence the likelihood function LHF has a maximum value only when f(r)=PSF[r].EOBJ based on Jensen's inequality.

Figure 5A:
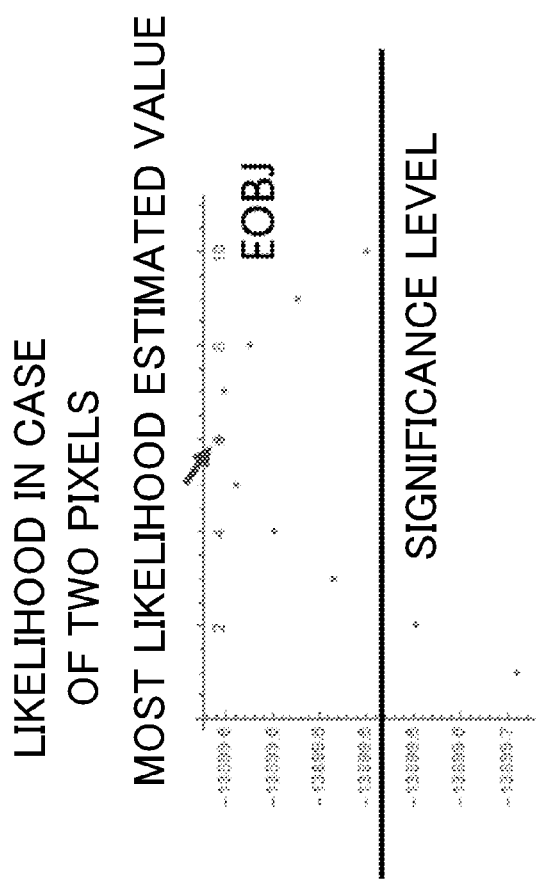
FIG. 5(A) and FIG. 5(B) are diagrams depicting an interval estimation.
Figure 5B:
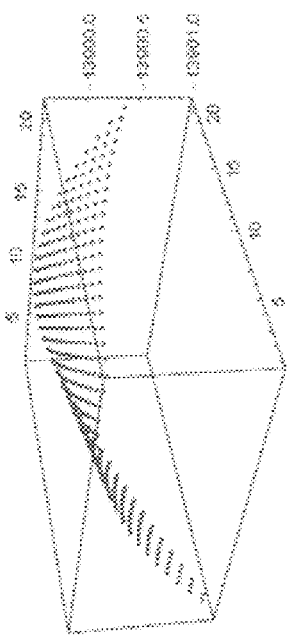

Further, the evaluation function LHF is an upward-convex function, which means that an error can be evaluated by calculating the likelihood for the estimated image is near the most likelihood estimated value. FIG. 5(A) and FIG. 5(B) indicate evaluation values of the estimated images near the most likelihood estimated value. To simplify, FIG. 5(A) indicates a case when the estimated image EOBJ has two pixels, and FIG. 5(B) indicates a case when the estimated image EOBJ has three pixels, but in reality the estimated image EOBJ is constituted by many more pixels (e.g. $100^3$ to $1000^3 = 10^6$ to $10^9$ pixels). The calculation volume and the data volume become high if the evaluation values are determined for all possible estimated images, but the calculation volume and the data volume can be decreased by determining the evaluation values only for the estimated images near the most likelihood value.

Figure 6A:
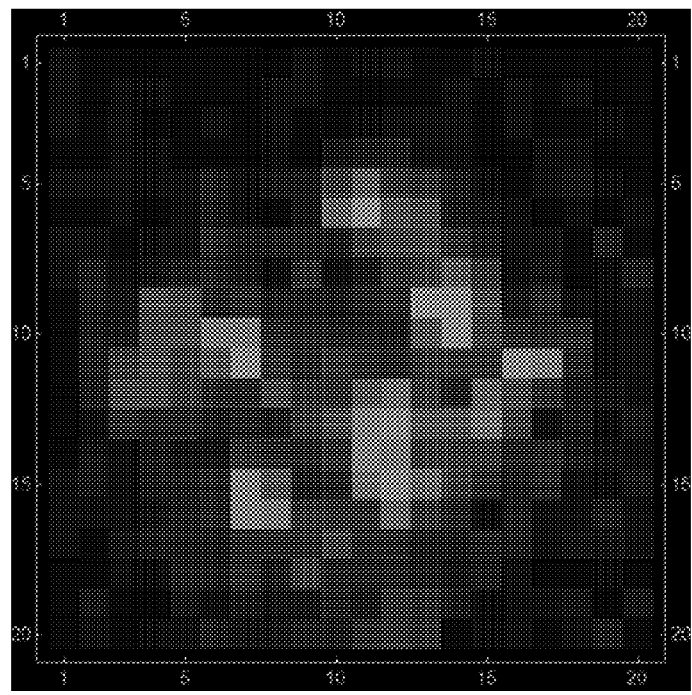
FIG. 6(A) is a diagram depicting a recovery result IPSF.IM.
Figure 6B:
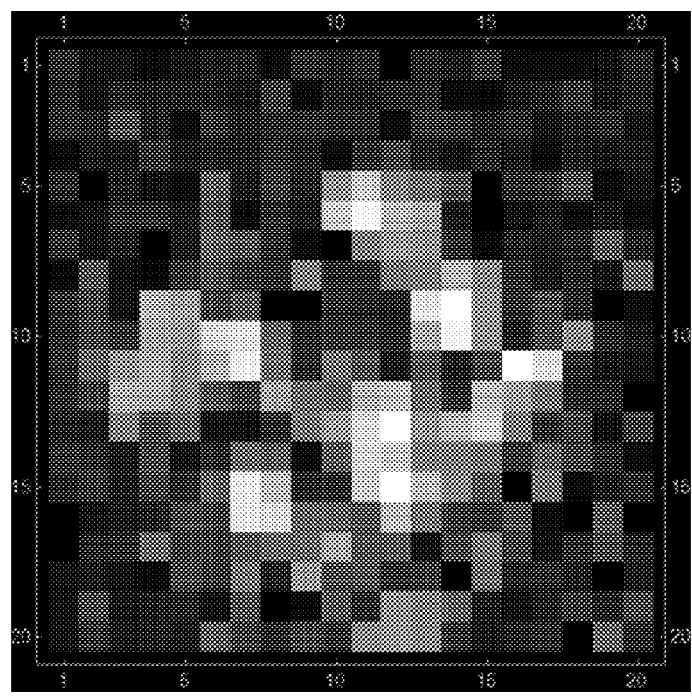
FIG. 6(B) is a diagram depicting a result of performing the binning process on this recovery result IPSF.IM; and these diagrams indicate a plurality of yeast SEC24 on the COP2 vesicle marked by green fluorescent protein GFP (1 pixel=195 nm).

As indicated in FIG. 5(A), the interval can be estimated if the significance level is determined, and an image representing the interval can be output in a format that allows being recognized intuitively. For example, if binning (adding adjacent pixels to increase the pixel size) is performed up to a reliable level, a reliable image can be acquired. For example, when none of the recovered pixels constituted of three pixels satisfy the significance level (FIG. 5(B)), a recovered image having at least the significance level can be acquired by generating an image constituted by two pixels using binning (FIG. 5(A)). FIG. 6(A) indicates an estimated image EOBJ, and FIG. 6(B) is an image after binning is performed up to a reliable level satisfying an appropriate significance level. By performing the binning and sufficiently increasing the photon number per pixel, an image having high reliability and high resolution can be acquired.

If data associating the estimated images near the most significant estimated value (most significant estimated original image) and the evaluated values thereof is stored in advance, an image can be easily generated when the significance level is changed. Here the final output is in an image format, but the recovered information may be output arbitrarily.

According to this method, recovery using out-of-band extrapolation, which was not attempted in conventional deconvolution, is implemented. Since the information is not lost by the filter process, the original data and the recovered data are converted one-to-one, and conventional blur can be prevented. Further, reliability of estimation can be quantitatively discussed by evaluating an error near the most likelihood estimated value.

In the present method, the calculation accuracy is precisely determined in actual numerical calculation, and no approximate calculation is performed. This is to accurately perform error evaluation. As a result, the calculation volume increases compared with the prior art, hence the calculation volume is decreased using parallel calculation and symmetric properties.

<Device Configuration>

The microscope according to this embodiment should capture an image at high-speed and high resolution under the single photon condition. The single photon condition is a condition in which at most one photon is detected at one irradiation. An example of such a measurement apparatus is a confocal scanner microscope system (see PTL 3) that can capture images at high-speed. The configuration thereof will be described in brief.

Figure 7:
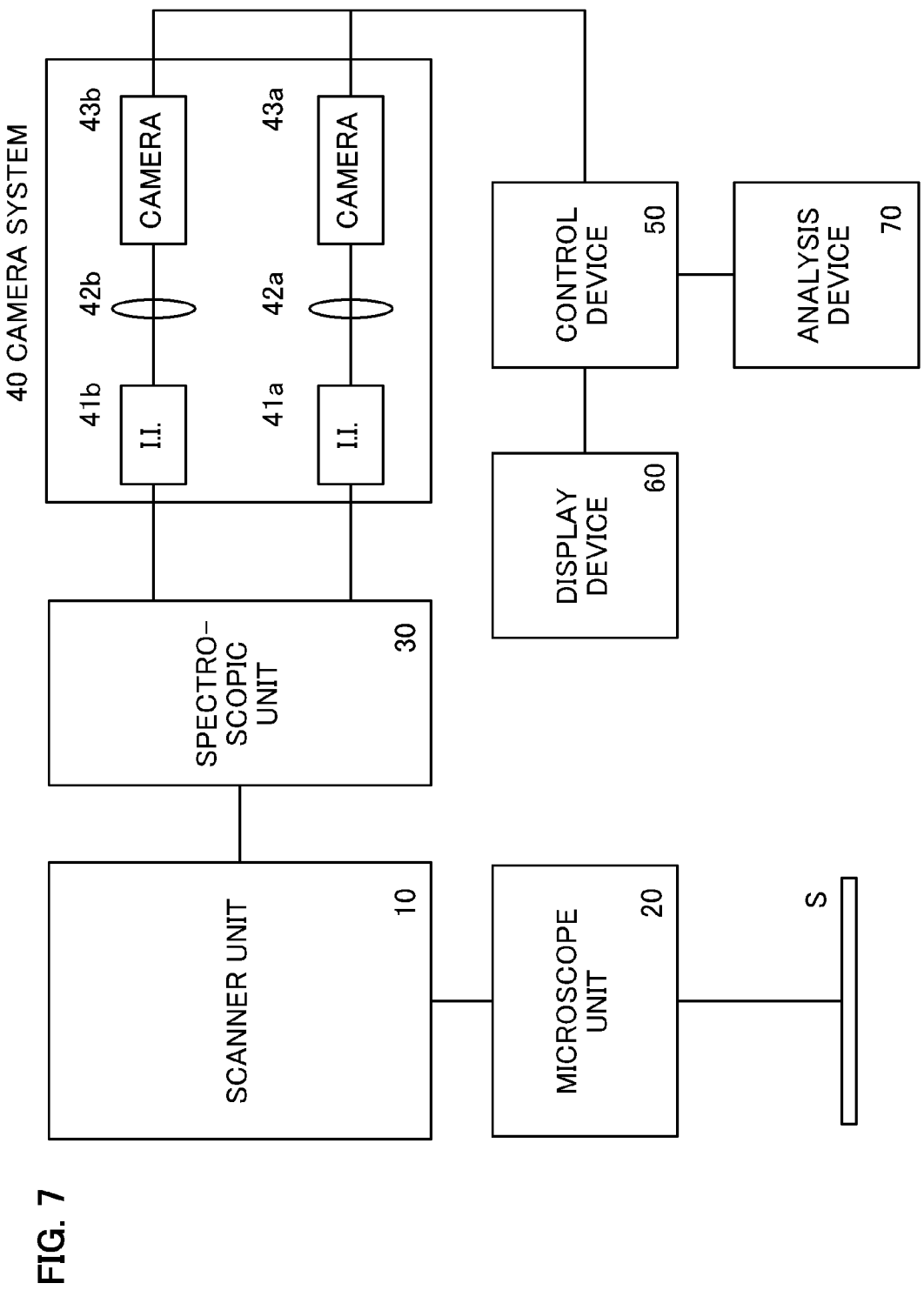
FIG. 7 is a diagram depicting a configuration of a microscope system according to the present embodiment.

FIG. 7 is a diagram depicting a general configuration of the confocal scanner microscope system according to this embodiment. The confocal scanner microscope system is constituted by a Nipkow disk type scanner unit 10 with a micro lens disk, a microscope unit 20, a spectroscopic unit 30, a camera system 40, a control device 50, a display device 60 and an analysis device 70.

The scanner unit 10 primarily includes a light source unit, a micro lens disk and a pinhole disk. The light source unit is a device that irradiates an excitation light having a wavelength to excite a fluorescent substance that marks an observation target substance. For the light source unit, a single or a plurality of light sources are used in accordance with the type of fluorescence emitted from the observation target, such as a laser light source, an ultra-high-pressure mercury lamp, a xenon lamp and an ultraviolet LED.

The micro lens disk and the pinhole disk are disposed to face each other, and each micro lens of the micro lens disk condenses the laser light that enters to a corresponding pinhole of the pinhole disk. By condensing the light by the micro lens array, the quantity of light that passes through the pinhole disk increases considerably. Further, the light (reflected) on the disk surface other than the pinhole s (noise light) decreases, and the SN ratio improves. The laser light emitted from a pinhole of the pinhole disk excites the sample S via the microscope unit 20. The fluorescent light emitted from the sample S passes through the pinhole disk of the scanner unit 10 again via the microscope unit 20, is reflected by the dichroic mirror, and is guided to the observation optical system.

The spectroscopic unit 30 branches the light included in the fluorescent light into two using the dichroic mirror and the like. Here the light is branched into two, but may be branched into three or more, or light having only one wavelength may be imaged without branching. The camera system 40 is constituted by a number of image intensifiers 41, relay lenses 42 and cameras 43 in accordance with the number of branches.

The image intensifier 41 outputs an input weak optical image as an amplified output image by amplifying photon detection signals 100 times to 10000 times. The output light of the image intensifier 41 is condensed by the relay lens 42, and enters the camera 43. The camera 43 is a high-speed and high sensitivity camera that is sCMOS-based, for example. The camera 43 outputs the image data representing the captured image to the control device 50. It is preferable that the noises of the image intensifier 41 and the camera 43 are both suppressed by cooling.

The control device 50 is a conventional computer that includes a microprocessor, a storage device and the like, and controls the entire microscope system. The control device 50 stores the image data acquired from the camera 43 into the storage device so that the analysis device 70 can reconstruct the image data later. The display device 60 displays an image acquired from the camera 43 and a screen that indicates the measurement state during operation among others.

<Content of Processes>

[Determining PSF and IPSF]

Figure 8:
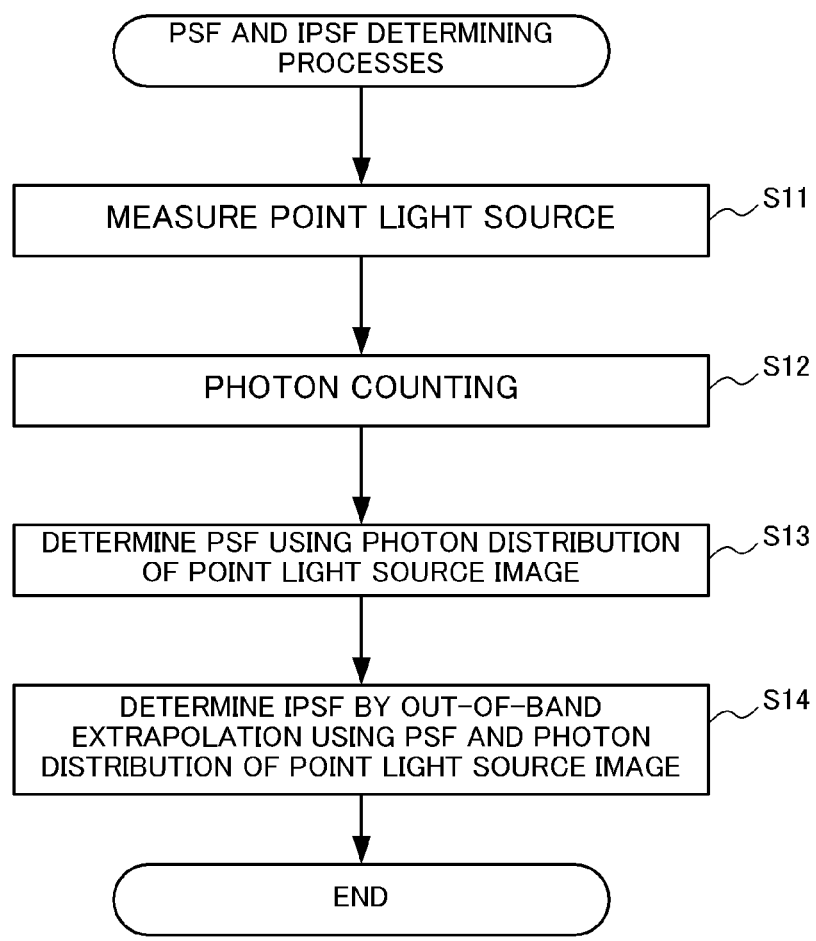
FIG. 8 is a flow chart depicting a flow of PSF and IPSF determining processes.
Figure 9:
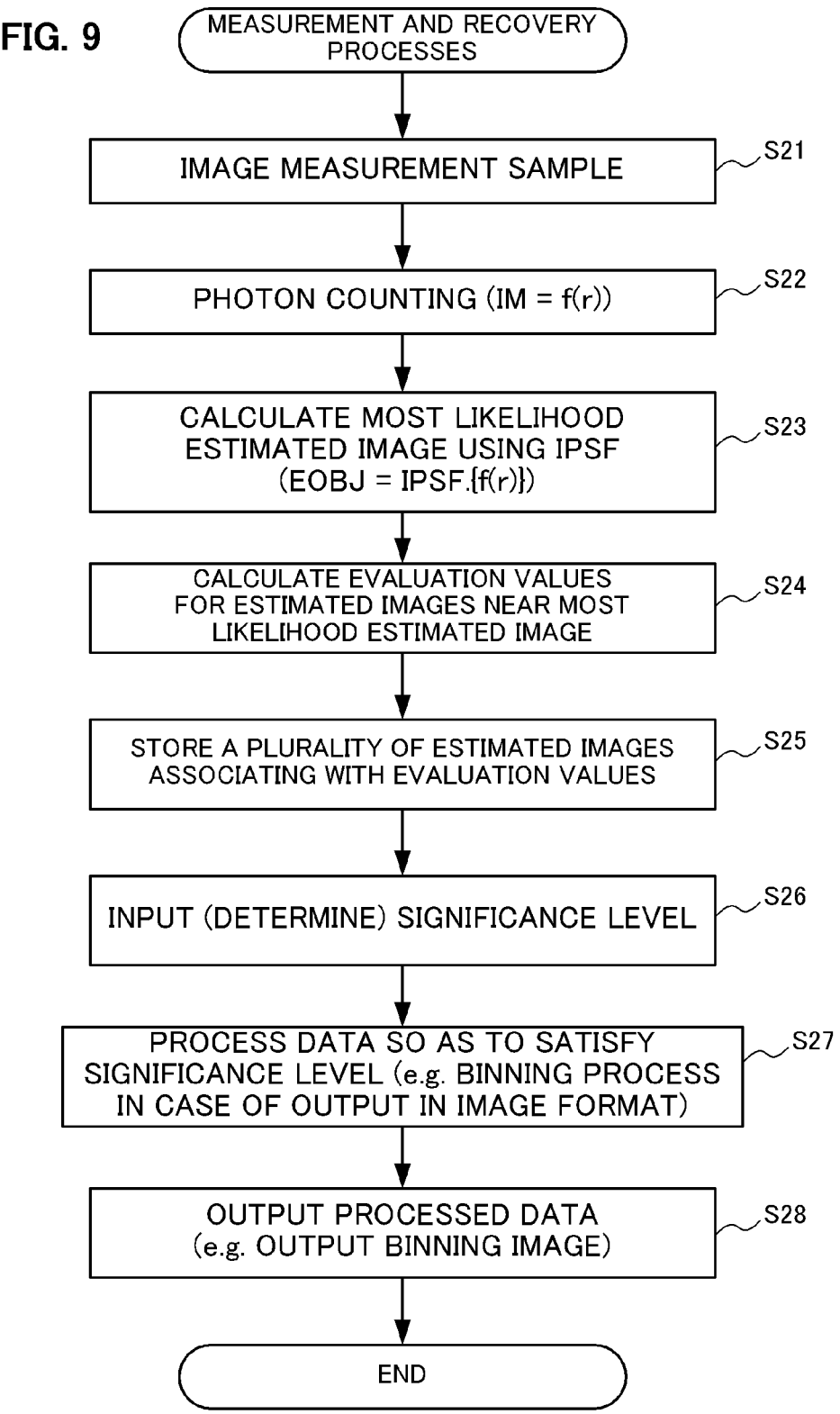
FIG. 9 is a flow chart depicting a flow of the measurement and image recovery processes.

FIG. 8 is a flow chart depicting a process of determining the point spread function PSF and the inverse function IPSF thereof. In step S11, a micro-point light source (evaluation sample), such as a Q-Dot (quantum dot) is measured under the single photon condition. In this case, a three-dimensional image is acquired by capturing images at high-speed while changing the Z position, for example. At this time, the probability distribution of the noise characteristic of the system is also measured.

In step S12, the analysis device 70 determines the photon detected position in each captured image. As indicated in FIG. 2, a region, where one photon is amplified and spread by the image intensifier, is captured in the image. The analysis device 70 regards that one photon is detected at the center of this region, and increments the number of photons by 1. By detecting a photon in each captured image, three-dimensional distribution of the photon detection frequency can be acquired.

In step S13, the analysis device 70 determines the PSF using the captured image of the point light source (photon distribution). In step S13, the analysis device 70 also determines the IPSF from the PSF and the captured image of the point light source using out-of-band extrapolation. As mentioned above, when the observation view field has only a finite size, the spectral information outside the passing band can be acquired using the spectral information within the passing band. The PSF can be determined by an algebraic method.

The analysis device 70 stores the thus determined PSF and IPSF in memory.

[Measurement and Recovery Processes]

FIG. 8 is a flow chart depicting the flow of the measurement process and the analysis process of the measurement object.

In step S21, the observation target sample (e.g. biological sample) is measured under the single photon condition. At this time, a three-dimensional image is acquired by consecutively imaging the sample at high-speed while changing the Z position.

In step S22, the analysis device 70 determines the photon detected position in each captured image. This process is the same as step S12, hence detailed description is omitted. When the image captured at time $t_k$ is $I_k(x, y)$, the detected photon distribution $I'_k(x, y)$ has value 1 at the detected position, and value 0 at other positions.

In the following, the integrated images captured in a certain time range, from t-a to t+a, is handled as a snap shot of a three-dimensional image at time t. In concrete terms, three-dimensional distribution IM=f(x, y, z) at time t is acquired as follows.

$$IM = f(x, y, z) = \frac{1}{N} \sum_{t-a < t_k < t+a} I'_k(x, y) \quad [\text{Math. 2}]$$

where N is the total number of detected photons during this period:

$$\sum_{t-a < t_k < t+a, \text{for all } x', y'} I'_k(x', y')$$

Here time 'a' is assumed to be a short time in which the movement of the sample can be ignored. The captured images may be handled as a four-dimensional image considering the change in time as well, or may be handled as a two-dimensional image, that is, an image on a specific plane alone.

Then in step S23, the analysis device 70 acquires the estimated image $OBJ_{EST}$=IPSF.{f(x, y, z)} by multiplying the three-dimensional photon distribution f(x, y, z) by IPSF. As mentioned later, the estimated image $OBJ_{EST}$ recovered like this is a most likelihood estimated image (most likelihood estimated value) in which the evaluation value (likelihood) is the maximum, in other words, the probability that this estimated image is the actual image is highest.

In step S24, the analysis device 70 calculates evaluation values for evaluating an error for estimated images near the most likelihood estimated value. For the error evaluation method, the most likelihood method, the Bayesian method, the least square method or the like can be used. It is preferable that the user can specify an evaluation method to be used. A case of using the most likelihood method will be described herein below as an example.

In the most likelihood method, the evaluation function LHF is defined as follows.

$$LHF[IM, EOBJ] = \prod_{x,y,z} (PSF[x, y, z] \cdot EOBJ)^{f(x,y,z) \cdot N} \quad [\text{Math. 3}]$$

The total of PSF.EOBJ is 1, hence LHF is the maximum only when f(x, y, z)=PSF.EOBJ based on Jensen's inequality. In other words, EOBJ=IPSF.{f(x, y, z)}=$OBJ_{EST}$ is the most likelihood estimated value.

The analysis device 70 calculates the likelihood (evaluation value) for the estimated images $OBJ'_{EST}$ near the most likelihood estimated value $OBJ_{EST}$. Here the definition of "near" of the most likelihood value is arbitrary. For example, images which a variation from −2 to +2 are added to each pixel value of the most likelihood estimated value $OBJ_{EST}$, that is, ($5^{number\ of\ pixels}$) images are defined as "near" the most likelihood estimated value. The range of the variation values may be different depending on the pixel, or the variation values assigned to a plurality of pixels may be correlated.

If the probability distribution of the noise characteristic of the system is also measured in the PSF measurement process, it is preferable to define the likelihood function considering the probability distribution of the noise characteristic as well. Thereby the likelihood becomes more appropriate.

In step S25, the analysis device 70 associates a plurality of estimated images $OBJ'_{EST}$ near the most likelihood estimated value $OBJ_{EST}$ determined in steps S24 and S25, with the likelihood thereof, and stores this data in memory as intermediate data. Based on this data, interval estimation and data output in various display formats become possible.

Here a case of displaying the measurement sample in the image format will be described as an example. In step S26, the analysis device 70 determines the significance level for the interval estimation. For example, the analysis device 70 receives input of the significance level from the user.

In step S27, the analysis device 70 processes the data so as to satisfy the significance level. In the case of displaying the measurement sample in the image format, the binning process may be performed. The binning to satisfy the significance level may be freely determined. For example, one simple way is to gradually increase a number of pixels to be integrated into one pixel until the likelihood (evaluation value) of the image becomes at least the significance level. In step S28, the analysis device 70 outputs (displays) the processed data having at least the significance level of likelihood (evaluation value) (image after the binning process in this example) to the display device 60, or stores the processed data in memory.

<Advantageous Effect of this Embodiment>

In this embodiment, data can be recovered using the out-of-band extrapolation based on the image acquired by the high-speed and high precision measurement system. Since information is not lost by the filter process, the original data and the recover data can be converted one-to-one, and the conventional blur can be prevented. Further, the photon number is determined by photon counting, therefore a precise error evaluation can be performed based on this photon number. Further, by performing error evaluation near the estimated value, reliability of the estimation can be quantitatively evaluated. Because of this error evaluation, a reliable recovery result can be acquired without eliminating noise using the filter process.

The original image candidates near the most likelihood estimated value and the evaluation value (likelihood) are stored as the intermediate data, hence only data processing process (S27) can be performed again if the significance level is changed. To change the display format as well, the process can be performed using the intermediate data. In other words, the significance level and the display format can be changed easily.

Modifications

The present method can be suitably applied to measurement using a sequencer or micro array. In the case when the observation target substances are disposed in a grid pattern, such as DNA samples, the bright spot positions are always the same. When the bright spot positions are discrete and fixed, if this state is used as the constraint condition of the present method, a number of dimensions of the estimated image decreases, which decreases the calculation volume and improves the recovery accuracy. If the higher resolution can be implemented by this method, the grid density can be increased, and such effects as an increase in the parallel processing capability, a decrease in the size of the substrate, and a decrease in the amount of samples can be implemented, and the throughput of the measurement improves.

According to the above embodiment, the photon counting is performed using the image intensifier under the single photon condition. However, the present method can be used if the photon detection distribution is acquired, and the photon detection distribution need not be acquired by the photon counting. For example, the photon number distribution may be acquired by the luminance values of the camera, without performing the photon counting using the image intensifier.

REFERENCE SIGNS LIST

10 Scanner unit
20 Microscope unit
30 Spectroscopic unit
40 Camera system
50 Control device
60 Display device
70 Analysis device

The invention claimed is:

1. A data recovery device, comprising:
   a processor; and
   a memory storing a program, which, when executed by the processor, causes the processor to function as:
   a determination unit adapted to determine a point spread function (PSF) based on a photon distribution of a point light source image, and to determine an inverse function of the PSF (IPSF) from the PSF and the point light source image using out-of-band extrapolation;
   an acquiring unit adapted to acquire photon detection number distribution of an image acquired from an imaging optical system;
   a recovering unit adapted to acquire an estimated image from the photon detection number distribution using the IPSF;
   an evaluation value calculating unit adapted to calculate, in relation to each of the estimated image and a plurality of images similar to the estimated image, an evaluation value indicating a likelihood that the image is an actual image; and
   an outputting unit adapted to generate and output a physical parameter with which the evaluation value is at least a significance level, wherein the evaluation value is a value indicating a probability of acquiring the photon detection number distribution under the assumption that the estimated image is the actual image.

2. The data recovery unit according to claim 1, wherein the acquiring unit is adapted to acquire the photon detection number distribution by determining the detection number of photons in each of a plurality of images which are captured such that the photons can be counted.

3. The data recovery device according to claim 2, wherein the acquiring unit is adapted to acquire the photon detection number distribution under the assumption that a single photon is detected at the center of luminance distribution in each of a plurality of images captured under a single photon condition.

4. The data recovery device according to claim 1, wherein the acquiring unit is adapted to acquire the photon detection number distribution from an image captured by a microscope which includes an image intensifier and an imaging apparatus.

5. The data recovery device according to claim 1,
   wherein the physical parameter is an image, and
   wherein the outputting unit is adapted to perform a binning process based on the estimated image and a plurality of images similar to the estimated image, and to generate and output an image of which the evaluation value is at least a significance level.

6. A microscope system, comprising:
   a microscope that includes an image intensifier and an imaging apparatus; and
   the data recovery device according to claim 1.

7. A data recovery method, comprising:
   a first determining step of determining a point spread function (PSF) based on a photon distribution of a point light source image;
   a second determining step of determining an inverse function of the PSF (IPSF) from the PSF and the point light source image using out-of-band extrapolation;

an acquiring step of acquiring photon detection number distribution of an image acquired from an imaging optical system;

a recovering step of acquiring an estimated image from the photon detection number distribution using the IPSF;

an evaluation value calculating step of calculating, in relation to each of the estimated image and a plurality of images similar to the estimated image, an evaluation value indicating a likelihood that the image is an actual image; and an outputting step of generating and outputting a physical parameter with which the evaluation value is at least a significance level, wherein the evaluation value is a value indicating a probability of acquiring the photon detection number distribution under the assumption that the estimated image is the actual image.

8. A non-transitory computer-readable medium storing a program causing a computer to execute each step of the method according to claim 7.

9. A data recovery device, comprising:
a processor; and
a memory storing a program, which, when executed by the processor, causes the processor to function as:
    a determination unit adapted to determine a point spread function (PSF) based on a photon distribution of a point light source image, and to determine an inverse function of the PSF (IPSF) from the PSF and the point light source image using out-of-band extrapolation;
    an acquiring unit adapted to acquire photon detection number distribution of an image acquired from an imaging optical system;
    a recovering unit adapted to acquire an estimated image from the photon detection number distribution using the IPSF;
    an evaluation value calculating unit adapted to calculate, in relation to each of the estimated image and a plurality of images similar to the estimated image, an evaluation value indicating a likelihood that the image is an actual image; and
    an outputting unit adapted to generate and output a physical parameter with which the evaluation value is at least a significance level, wherein the physical parameter is an image, and wherein the outputting unit is adapted to perform a binning process based on the estimated image and a plurality of images similar to the estimated image, and to generate and output an image of which the evaluation value is at least a significance level.

10. The data recovery unit according to claim 9, wherein the acquiring unit is adapted to acquire the photon detection number distribution by determining the detection number of photons in each of a plurality of images which are captured such that the photons can be counted.

11. The data recovery device according to claim 10, wherein the acquiring unit is adapted to acquire the photon detection number distribution under the assumption that a single photon is detected at the center of luminance distribution in each of a plurality of images captured under a single photon condition.

12. The data recovery device according to claim 9, wherein the acquiring unit is adapted to acquire the photon detection number distribution from an image captured by a microscope which includes an image intensifier and an imaging apparatus.

13. The data recovery device according to claim 9, wherein the evaluation value is a value indicating a probability of acquiring the photon detection number distribution under the assumption that the estimated image is the actual image.

14. A microscope system, comprising:
a microscope that includes an image intensifier and an imaging apparatus; and
the data recovery device according to claim 9.

15. A data recovery method, comprising:
a first determining step of determining a point spread function (PSF) based on a photon distribution of a point light source image;
a second determining step of determining an inverse function of the PSF (IPSF) from the PSF and the point light source image using out-of-band extrapolation;
an acquiring step of acquiring photon detection number distribution of an image acquired from an imaging optical system;
a recovering step of acquiring an estimated image from the photon detection number distribution using the IPSF;
an evaluation value calculating step of calculating, in relation to each of the estimated image and a plurality of images similar to the estimated image, an evaluation value indicating a likelihood that the image is an actual image; and
an outputting step of generating and outputting a physical parameter with which the evaluation value is at least a significance level, wherein the physical parameter is an image, and wherein the outputting step performs a binning process based on the estimated image and a plurality of images similar to the estimated image, and generates and outputs an image of which the evaluation value is at least a significance level.

16. A non-transitory computer-readable medium storing a program causing a computer to execute each step of the method according to claim 15.

* * * * *